(12) United States Patent
Alexander

(10) Patent No.: US 6,859,681 B1
(45) Date of Patent: Feb. 22, 2005

(54) MULTI-MATERIAL TOOLPATH GENERATION FOR DIRECT METAL DEPOSITION

(75) Inventor: Paul Alexander, Novi, MI (US)

(73) Assignee: The POM Group, Auburn Hills, MI (US)

( * ) Notice: Subject to any disclaimer, the term of this patent is extended or adjusted under 35 U.S.C. 154(b) by 622 days.

(21) Appl. No.: 09/671,536

(22) Filed: Sep. 27, 2000

Related U.S. Application Data

(60) Provisional application No. 60/156,249, filed on Sep. 27, 1999, and provisional application No. 60/156,204, filed on Sep. 27, 1999.

(51) Int. Cl.[7] .............................................. G06F 19/00
(52) U.S. Cl. ........................... 700/184; 700/98; 700/118
(58) Field of Search ............................. 700/97, 98, 118, 700/119, 180, 182, 184; 204/401

(56) References Cited

U.S. PATENT DOCUMENTS

| | | | |
|---|---|---|---|
| 4,323,756 A | | 4/1982 | Brown et al. .......... 219/121 LF |
| 4,724,299 A | | 2/1988 | Hammeke ............... 219/121 L |
| 5,122,564 A | | 6/1992 | George ....................... 524/417 |
| 5,497,453 A | * | 3/1996 | Megahed et al. ........... 345/422 |
| 5,555,481 A | * | 9/1996 | Rock et al. .................... 419/30 |
| 5,837,960 A | | 11/1998 | Lewis et al. ........... 219/121.63 |
| 5,990,897 A | * | 11/1999 | Hanratty ..................... 345/420 |
| 6,193,922 B1 | * | 2/2001 | Ederer ......................... 264/401 |
| 6,280,784 B1 | * | 8/2001 | Yang et al. ................. 426/231 |
| 6,391,251 B1 | * | 5/2002 | Keicher et al. ................ 419/7 |
| 6,410,105 B1 | * | 6/2002 | Mazumder et al. ......... 427/554 |
| 6,574,523 B1 | * | 6/2003 | Hanna et al. ............... 700/120 |

* cited by examiner

Primary Examiner—Albert W. Paladini
Assistant Examiner—Zoila Cabrera
(74) Attorney, Agent, or Firm—Gifford, Krass, Groh, Sprinkle, Anderson & Citkowski, PC

(57) ABSTRACT

A method of modeling multiple material parts for additive manufacturing processes such direct metal deposition operates within the constraints of a single material CAD system. Each material is modeled separately as a single or multiple solid part, under the assumption that there are no internal multiple materials; that is, no voids for other material parts. The parts are ordered from the outer most geometry to the innermost geometry and Boolean operations are performed to calculate the final volume for each part. In use of the invention, should any design changes occur, only the parts as originally defined need to be modified, and the method is reapplied. The method is applicable to the generation of CAM cutting paths for 2½-D and 3-D geometries by pocket machining with spiral-in, spiral-out, and arbitrary direction raster tool paths using stock material with and without reflection, depending upon the geometry. Single- and multi-material files may be merged one toolpath file, and commands may be embedded for closed- or open-loop control of the fabrication process.

6 Claims, 6 Drawing Sheets

FIG - 4A  FIG - 4B

MULTI-MATERIAL TOOLPATH GENERATION FOR DIRECT METAL DEPOSITION

REFERENCE TO RELATED APPLICATION

This application claims priority from U.S. Provisional Patent Application Ser. Nos. 60/156,249 and 60/156,204, both filed Sep. 27, 1999 and the entire contents of both applications being incorporated herein by reference.

FIELD OF THE INVENTION

This invention relates generally to the layered fabrication of three-dimensional components and, in particular, to a closed-loop system and method wherein tool paths are generated for multiple materials using a direct metal deposition process.

BACKGROUND OF THE INVENTION

Fabrication of three-dimensional metallic components via layer-by-layer laser cladding was first reported in 1978 by Breinan and Kear. In 1982, U.S. Pat. No. 4,323,756 issued to Brown et al., describes a method for the production of bulk rapidly solidified metallic articles of near-net shape, finding particular utility in the fabrication of certain gas turbine engine components including discs and knife-edge air seals. According to the disclosure, multiple thin layers of feedstock are deposited using an energy beam to fuse each layer onto a substrate. The energy source employed may be a laser or an electron beam. The feedstock employed in the practice of the invention may be either a wire or powder material, and this feedstock is applied to the substrate in such a fashion that it passes through the laser beam and fuses to the melted portion of the substrate.

Different technologies have since evolved to improve such processes. U.S. Pat. No. 4,724,299 is directed to a laser spray nozzle assembly including a nozzle body with a housing that forms an annular passage. The housing has an opening coaxial with a passageway, permitting a laser beam to pass therethrough. A cladding powder supply system is operably associated with the passage for supplying cladding powder thereto so that the powder exits the opening coaxial with the beam.

Various groups are now working world-wide on different types of layered manufacturing techniques for fabrication of near-net-shape metallic components. In particular, nozzles of the type described above have been integrated with multi-axis, commercially available CNC machines for the fabrication of 3-dimensional components. U.S. Pat. No. 5,837,960 resides in a method and apparatus for forming articles from materials in particulate form. The materials are melted by a laser beam and deposited at points along a tool path to form an article of the desired shape and dimensions. Preferably the tool path and other parameters of the deposition process are established using computer-aided design and manufacturing techniques. A controller comprised of a digital computer directs movement of a deposition zone along the tool path and provides control signals to adjust apparatus functions, such as the speed at which a deposition head which delivers the laser beam and powder to the deposition zone moves along the tool path.

Most existing techniques, however, are based on open-loop processes requiring either considerable amount of periodic machining or final machining for close dimensional tolerances. Continuous corrective measures during the manufacturing process are necessary to fabricate net shape functional parts with close tolerances and acceptable residual stress. One exception is the system described in U.S. Pat. No. 5,122,564, filed Apr. 10, 1997. This application, the contents of which are incorporated herein by reference, describes a laser-aided, computer-controlled direct-metal deposition, or DMD, system wherein layers of material are applied to a substrate so as to fabricate an object or to provide a cladding layer.

In contrast to previous methodologies, the DMD system is equipped with feedback monitoring to control the dimensions and overall geometry of the fabricated article in accordance with a computer-aided design (CAD) description. The deposition tool path is generated by a computer-aided manufacturing (CAM) system for CNC machining, with post-processing software for deposition, instead of software for removal as in conventional CNC machining. Existing CAD systems, however, generally only have the ability to accommodate single-material parts. The need remains, therefore, for improved methods to assist in the modeling in CAD and generation of toolpaths for multiple material parts using existing CAD/CAM software.

SUMMARY OF THE INVENTION

In broad and general terms, this invention resides in a method of modeling multiple material parts for additive manufacturing processes, including direct metal deposition, within the constraints of a single material CAD system. According to a preferred embodiment, each material is modeled separately as a single or multiple solid part, under the assumption that there are no internal multiple materials; that is, no voids for other material parts. The parts are ordered from the outer most geometry to the innermost geometry and Boolean operations are performed to calculate the final volume for each part. If any design changes occur, only the parts as originally defined need to be modified, and the method is reapplied.

The method is applicable to the generation of CAM cutting paths for 2½-D and 3-D geometries by pocket machining with spiral-in, spiral-out, and arbitrary direction raster tool paths using stock material with and without reflection, depending upon the geometry. In each case, single- and multi-material files may be merged one toolpath file, and commands may be embedded for closed- or open-loop control of the fabrication process.

According to a different aspect of the invention, a single parameter value is used to encapsulate a set of process parameter values required to build a particular part. The group of parameters is called a recipe, and the value representing the recipe is called the recipe id. Each recipe id maps to a unique set of CAM parameters. An example recipe would include, but is not limited to, material, CNC velocity, laser power, and powder feed rate. The recipe may be determined by interpreting the part program and determining which CAM parameters were used to generate the part program. Alternatively, the CAM operator may embed the recipe id into the part program, since the CAM parameters were determined from a recipe id. To change the process parameters, a single memory location is chosen to store the recipe id, the software updates the process parameters with values in its database referring to that recipe id.

BRIEF DESCRIPTION OF THE DRAWINGS

FIG. 4A is a screen display of a 3d part with overhanging features;

FIG. 4B is a screen display of a part cut out of block showing resultant overhang;

DETAILED DESCRIPTION OF INVENTION

Figure 1A:
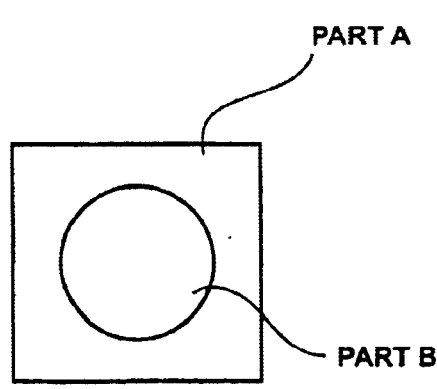
FIG. 1A is drawing which shows two parts, A and B, which match precisely.

In direct metal deposition, or DMD™, the dimensions and overall geometry of a fabricated article are rendered in accordance with a computer-aided design (CAD) description. For all but the simplest of parts, the geometry must be described mathematically. Modeling of the shapes involved is achieved through the use of CAD systems, and from these representations, tool paths are generated to drive a numerically controlled additive process to manufacture the part.

In order to drive the DMD's CNC system, a text file called the part program (or toolpath file) is generated from commercial CAM software containing commands that are understandable to the CNC. The commands are loaded into the memory and executed. Typical commands are move commands, which tell the CNC to move to a new point at a given speed, turn on/off the laser and powder flow. These commands are all embedded directly within the part program when it is created, and are triggered at specific points in the program. Some parameters which control the process must be changed dynamically during the processing of a part program, or are unknown at the time of part program generation, examples include powder flow rate, laser power, CNC velocity, gas flow rates.

Another factor which affects the values of these variable process parameters is how the part programs are generated. The pattern used to build the part (which can be spirals or rasters), the distance between centers of parallel paths, and the required layer thickness also affect the variable process parameters. These factors are also interdependent, such that changing one parameter affects the values of the others.

Since changes in the powder-feed system or processing conditions may change in accordance with experimentation, hard coding these factors into the part program might result in the parameters being sub-optimal at the time of manufacture under some operating conditions. Also, it would require the CAM operator who generates these part programs to have a detailed knowledge of the process, the processing parameters and how they affect the process. The more detail the CAM operator needs to know prior to generation of the part program, the more necessary that person is to the process.

To reduce the coupling between the CAM operator and process, the operator should only need to supply the minimum amount of information about the process from which the other parameter values are derived. The CAM operator is required to know the following CAM parameters when generating part programs:

1) layer thickness;
2) distance between adjacent roads; and
3) part material.

While many combinations of these values can be generated using CAM software, in practice the DMD process will only use a limited set of valid combinations. The CAM operator is, nevertheless, required to know which of these combinations are valid. The other process values are controlled by PC process control system based on the above three parameters. According to a different aspect of this invention, a single parameter value is used to encapsulate a set of process parameter values required to build the part. This parameter group is termed a "recipe," and the value representing the recipe, will be referred to as the "recipe id."

Each recipe id maps to a unique set of CAM parameters. An example recipe would include, but is not limited to, the following parameters:

Material
CNC velocity
Laser power
Powder feed rate

The recipe is preferably determined by interpreting the part program and determining which CAM parameters were used to generate the part program. Alternatively, the CAM operator may embed the recipe id into the part program, since the CAM parameters were determined from a recipe id. Both methods are valid but the latter is simpler to maintain.

In a specific equipment configuration, a GE Fanuc PMC coupled to the DMD machine includes memory locations which directly control the process. Setting these values directly changes the process parameters; that is, setting the memory address of the laser power to a higher value will increase the laser power, setting a value for the material to a different value will change the material, and setting the value of the CNC velocity will change the CNC velocity, and so on.

These memory locations are chosen so that they are directly accessible to part program running in the PMC memory and the PC based monitoring software. The monitoring application used to implement this is GE Fanuc's Cimplicity software. The recipe is stored in a database maintained by Cimplicity, and the fields in each record mapped to the appropriate memory location on the PMC. The PC is connected to the PMC via a high-speed serial bus, and the Cimplicity software is configured to have direct read/write access to the memory locations that control the parameters described in the recipe.

To change the process parameters, a single memory location is chosen according to the invention to store the recipe id. The part program is configured so that when process parameters need to be changed, the recipe id is written. The Cimplicity software is configured to monitor this value for changes. If the value changes, the software updates the process parameters on the PMC with values in its database referring to that recipe id. When these values change, they are directly changing the process parameters updating the process. The following is a list of the actions used to change the processing parameters:

| PMC | PC monitoring software |
|---|---|
| 1. Run part program change | monitor recipe id on PMC for |
| 2. Set PMC recipe id memory location to 0 | recipe id value changed check for recipe value doesn't exist so do nothing |
| 3. Set PMC recipe id memory location to new recipe value pause part program until recipe update complete | value changed check for recipe in data base it exists so write values in database to PMC memory send update complete to PMC |
| 4. Receive recipe update complete change | monitor recipe id on PMC for |
| 5 continue part program | |

This strategy has been fully implemented to manufacture a variety of parts, and is fully extensible to include any future DMD subsystems additions and extension to existing parameters controlled by the PMC controller.

Multi-material Considerations

The ability to manufacture components out of multiple materials using processes such as DMD is a recent development. Existing CAD systems are therefore limited to modeling single material parts. As such, CAD systems do not have the functionality to build models consisting of multiple materials.

Modeling each material as an individual part can be complex and time consuming, especially when design changes have to be made. The most important consideration is that each material part must not occupy the same volume as another material. The surfaces of each material can touch but one must not penetrate the surfaces of another material part.

Figure 1B:
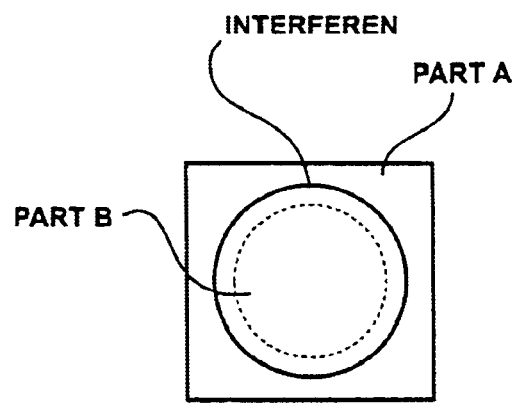
FIG. 1B is a drawing which illustrates a situation wherein Part B has changed, but Part A has not been modified to reflect the change, resulting in an interference between the two parts.

FIG. 1A shows two parts, A and B, that match precisely. In FIG. 1B, Part B has changed, but Part A has not been modified to reflect the change. There is an interference region where Part A and Part B overlap, resulting in an invalid multi-material part. In order to maintain valid geometry, this invention provides a methodology wherein valid multi-material parts are always generated. Important aspects of this methodology are as follows:
1. Each material is modeled separately as a single or multiple solid part ($P_1, P_2, \ldots P_n$, where "n" is the number of parts). Each part is modeled as a solid and as if there are no internal multiple materials, i.e. no voids for other material parts
2. The parts are then ordered from the outer most geometry to the innermost geometry ($P_{o1}, P_{o2}, \ldots, P_{on}$)
3. Once the geometry has been finalized, the following Boolean operations are performed to calculate the final volume for each part: $P_{fi}=P_{oi}-(P_{oi}\cup P_{oi+1}\cup \ldots P_{on})$, where "−" is the Boolean subtraction operation and "∪" is the Boolean union operation, and "i" is the current material part.

Figure 2:
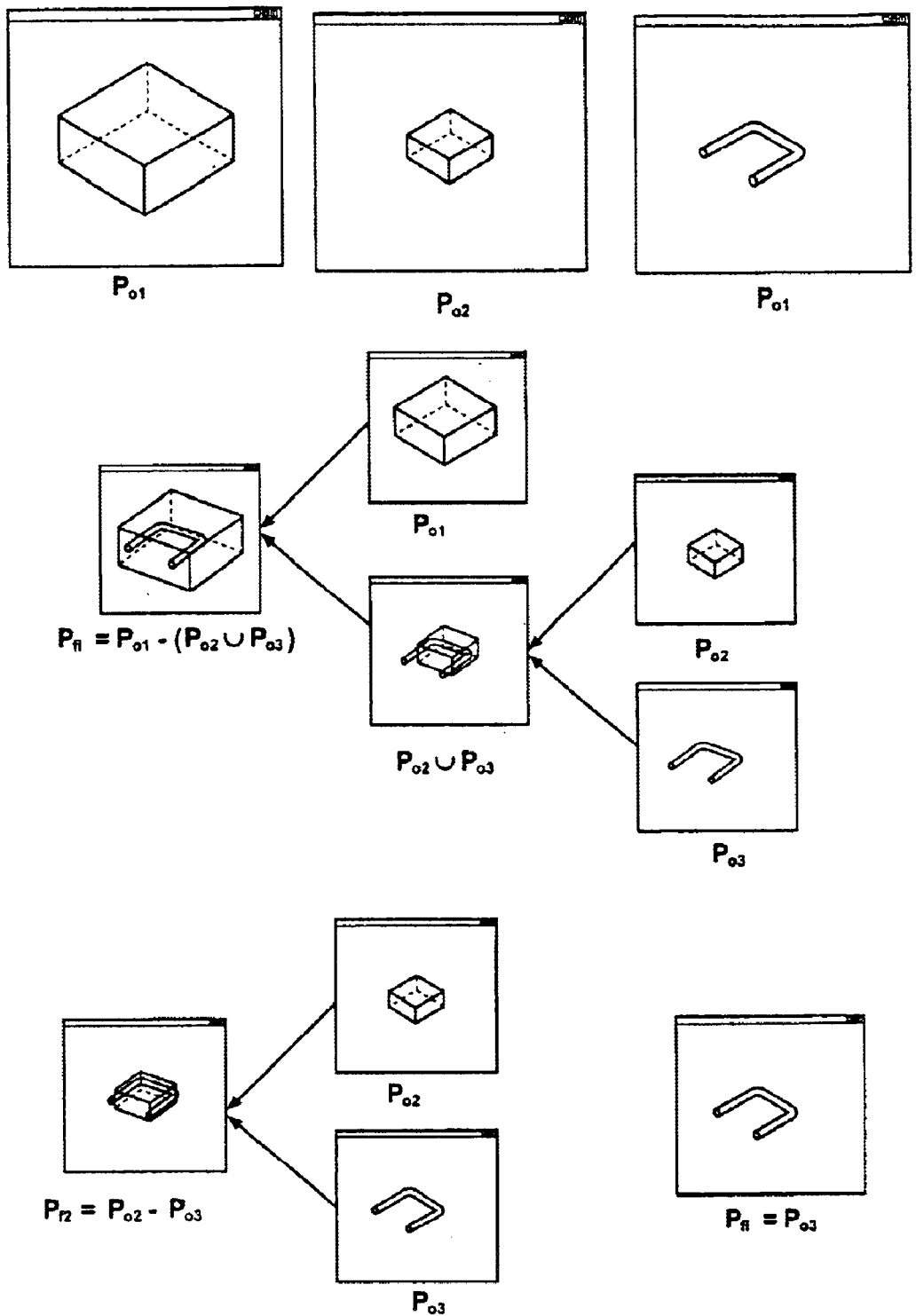
FIG. 2 shows the calculation of a multi-material geometry according to a preferred embodiment of the invention.

If any design changes occur, only the original parts $P_i$ need to be modified, and the method is reapplied. This method was implemented in SDRC I-DEAS and a sample geometry is shown in FIG. 2. I-DEAS also has a modeling feature known as association (common in other CAD packages) such that the construction of $P_{fi}$ is directly associative with its constructing geometry $P_{oi+1}, \ldots, P_{on}$. If any of these construction geometries are modified the final part $P_{fi}$ is automatically updated without the requirement of the CAD user to explicitly reapply the aforementioned methodology.

Once the geometry for each material has been created, tool paths need to be calculated to drive the computer-controlled DMD process. For multiple material geometries, parts are preferably manufactured in a layer-by layer approach. Each material part is sliced into a series of layers perpendicular to the build direction (for DMD, the z-axis). The algorithms used to merge material tool path sets only requires the slice planes for each material are parallel. The software does not require, and in some materials it is necessary, that the layer thicknesses for each material are equal or at the same level. This adds the flexibility of not limiting the deposition of each material to the material with the thinnest layers. It also allows parts to be manufactured with varying layer thicknesses. Since thinner layers result in higher surface accuracy, surfaces with high surface accuracy requirements are preferably manufactured using thinner layers. Conversely, surfaces requiring less accuracy can be manufactured with thicker layers.

Conventional CAM software is used to generate toolpaths for DMD. Traditional machining starts with a block of metal and machines away material from top to bottom to create the final part. These toolpaths are then written to a "neutral" cutter language (CL) file. This file is then post processed to the appropriate language to the CNC machine to cut the part from top to bottom from a solid block of metal.

Additive processes work in the opposite direction. They start with a blank and add material from bottom to top to generate the finished part. Commercial CAM software packages have the option of machining at a constant z-height, often called "z-roughing" or "z-machining" using a mill. This milling operation machines a pocket in a stock material at a series of constant z-levels.

A custom post processor was written for I-DEAS software in order to convert the CL file into a DMD machine readable part program. Some of the main features of the post processor are recognizing when the cutting starts and stops which is equivalent to starting and stopping the deposition in the DMD process. This was achieved by forcing the CAM package to rapid to a known z-level rapid across in the x-y plane to above the start point and plunge down to the correct level.

These three rapids are recognized by the post processor and converted to stopping the deposition moving to the new start point and beginning deposition. The second major feature is the ability to reverse the ordering of z-levels. This was achieved by reflecting the part in the x-y plane and machining in an increasingly negative direction. The post processor then negates all the z values in the post-processed file converting them from negative to positive. This creates z-levels that are increasing positive.

Figure 3A:
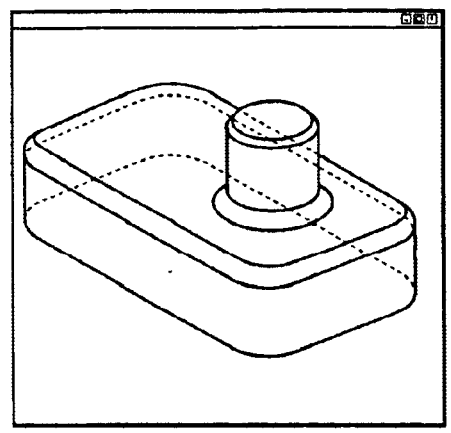
FIG. 3A is a screen display of a 2½D part to be manufactured.
Figure 3B:
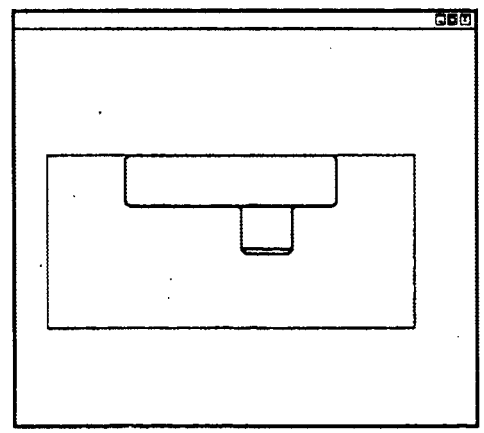
FIG. 3B is a screen display of a 2½D part inverted and subtracted from a block toolpaths are then generated.
Figure 3C:
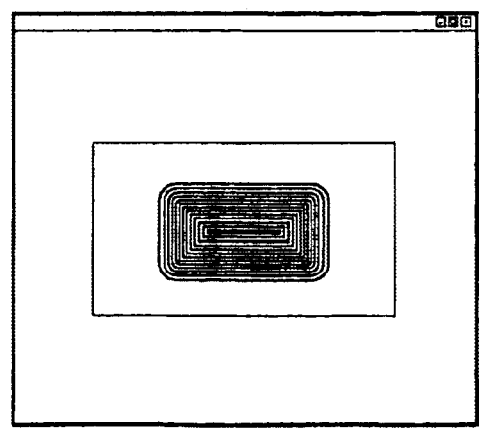
FIG. 3C is a screen display of a top view of one layer.
Figure 4C:
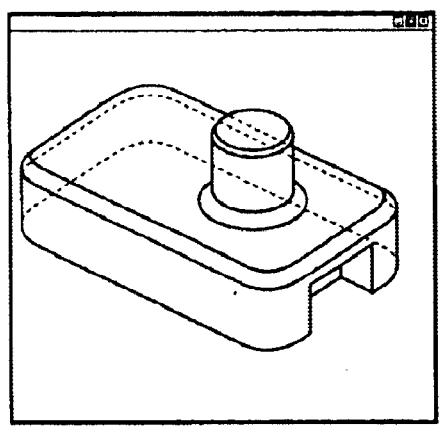
FIG. 4C is a screen display of a part split into two subparts such that each has no overhang.
Figure 4C:
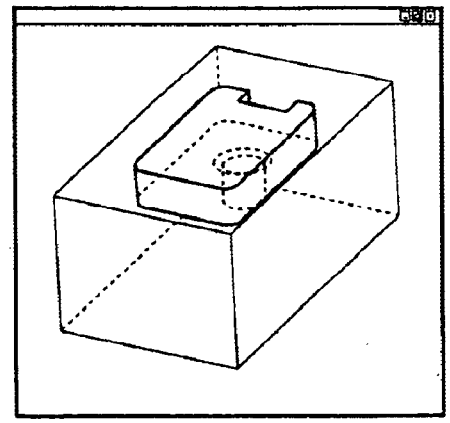
Figure 4C:
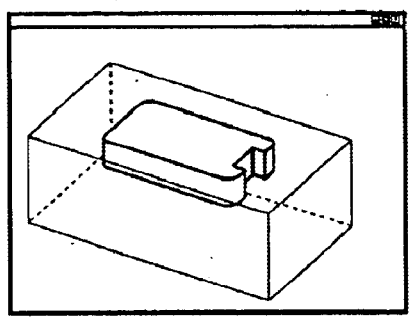
Figure 4C:
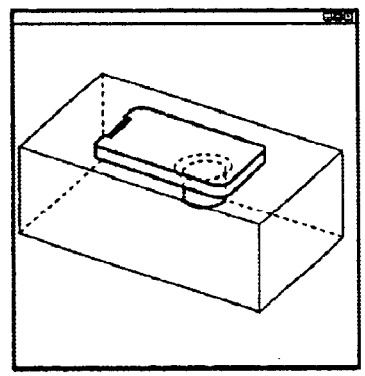
Figure 4D:
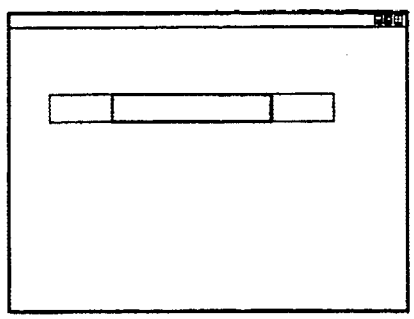
FIG. 4D is a screen display of toolpaths generated for each subpart.
Figure 4D:
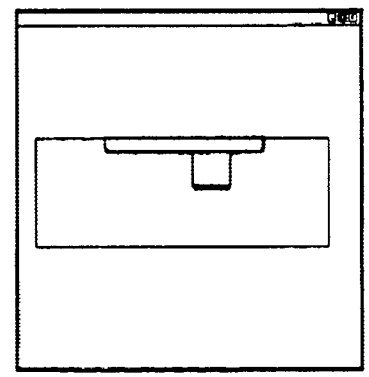

For 2½D parts (i.e. the geometry contains no overhanging features), the pocket can be defined such that it describes the geometry to be built with the additive process. The preferred method, as is illustrated in FIGS. 3A through 3C, is as follows:
1. Orient part so z=0 is at bottom of the part
2. Reflect part about the x-y plane. This causes the part to be machined from the bottom to the top
3. Subtract part from stock block
4. Define z heights from bottom of part to top of part
5. Define diameter of tool
6. Define toolpaths by style (spiral in, spiral out, raster), step over and distance from center of toolpath to edge of surface 7. Calculate tool paths for each height
8. Write CL file for tool paths.
9. Post process CL file. While post-processing negate all z-heights.

A problem arises if there are overhangs in the part, in the traditional milling sense. This situation results in undercuts in the stock material which cannot be reached with a mill without gouging the stock material. This feature is common to many CAD systems and as such generates errors and will not generate tool paths. There is usually no override for this collision detection. The following method overcomes this problem according to the invention, as illustrated in FIGS. 4A through 4D 1. Orient part so z=0 is at bottom of the part
2. Reflect part about the x-y plane. This causes the part to be machined from the bottom to the top
3. Divide part into subparts so each part has no overhang
For each subpart:
   A. Subtract part from stock block
   B. Define z heights from bottom of part to top of part
   C. Define diameter of tool
   D. Define toolpaths by style (spiral in, spiral out, raster), step over and distance from center of toolpath to edge of surface
   E. Calculate tool paths for each height
   F. Write CL file for tool paths.
   G. Post process CL file. While post-processing negate all z-heights.
4. Merge each CL file into one CL file
5. Post process CL file. While post processing negate all z heights.

Figure 5A:
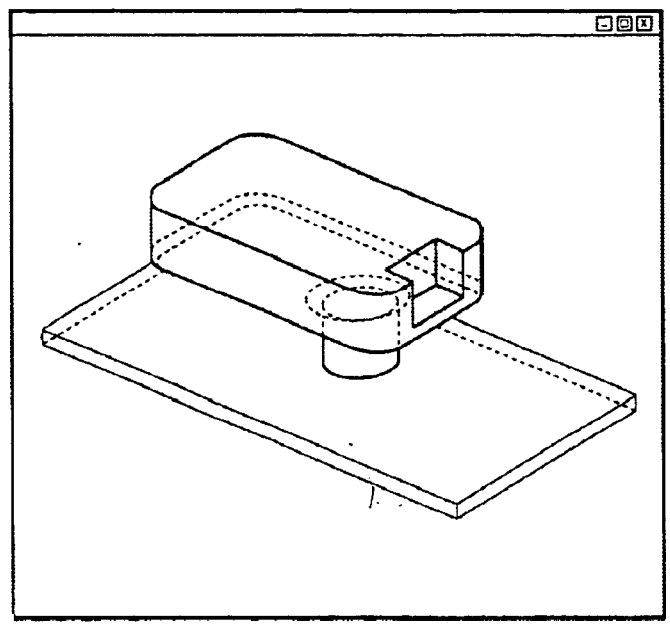
FIG. 5A is a screen display of a part to generate toolpaths defined as stock material and block defined as finished surface.
Figure 5B:
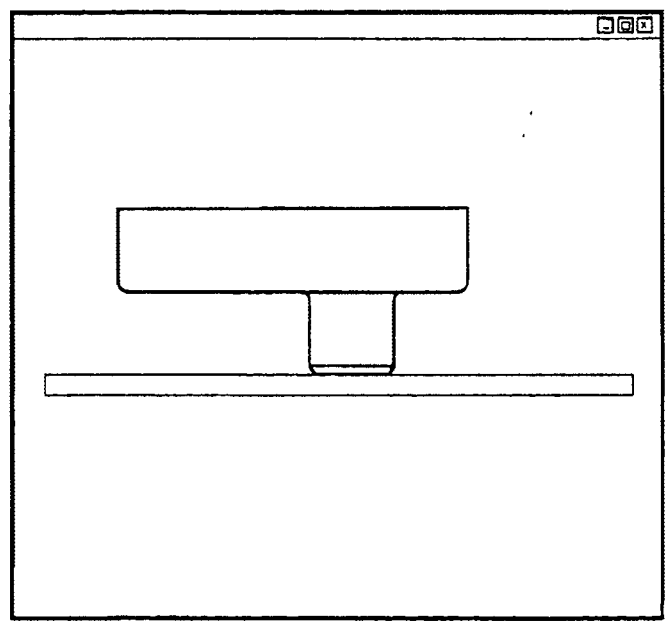
FIG. 5B is a screen display of resultant toolpaths.

For more complicated geometries, the method depicted in FIG. 5 may be more appropriate. Instead of subtracting the part from that stock material and machining the resultant pocket, define the part as the stock material and a new geometry below the stock to machine to. This is the equivalent of instructing the CAM software to machine away the "stock", layer by layer, until nothing remains. In order to ensure the order of z heights is correct the part is reflected about the x-y plane so the part is cut from z=0 to the most negative z depth. During post processing these z values are negated resulting in the correct ordering of the z levels.

1. Orient part so z=0 is at bottom of the part
2. Reflect part about the x-y plane.
3. Define part as a "stock volume"
4. Create a part at the lowest z height of stock volume
5. Define z heights from minimum z to maximum z where part will be sliced
6. Define style for tool paths (spiral in, spiral out, raster) which can be a function of the material
7. Calculate tool paths for each height
8. Write CL file for tool paths
9. Post process CL file. When post processing negate all z heights Reflecting each part is often undesirable because it is prone to error and it changes the geometry of the part. If the CAD operator were to forget the part was reflected further geometry modifications may be invalid. So, the an alternative method removes the need to reflect the part. It is the same as the previous method, except
   a) it does not reflect the part about the x-y plane in step 2; and
   b) the z-heights are not negated in step 6 resulting in toolpaths that are written in the reverse order to manufacture.

Figure 6A:
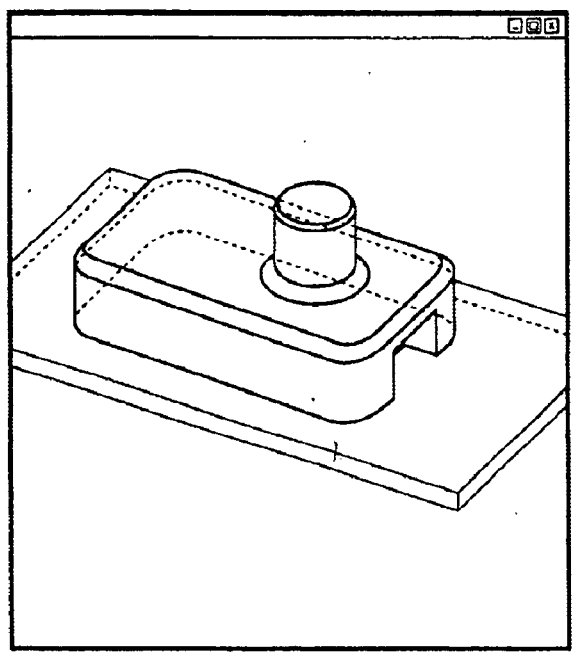
FIG. 6A is a screen display of a part to generate toolpaths defined as stock material and block defined as finished surface without reflection.
Figure 6B:
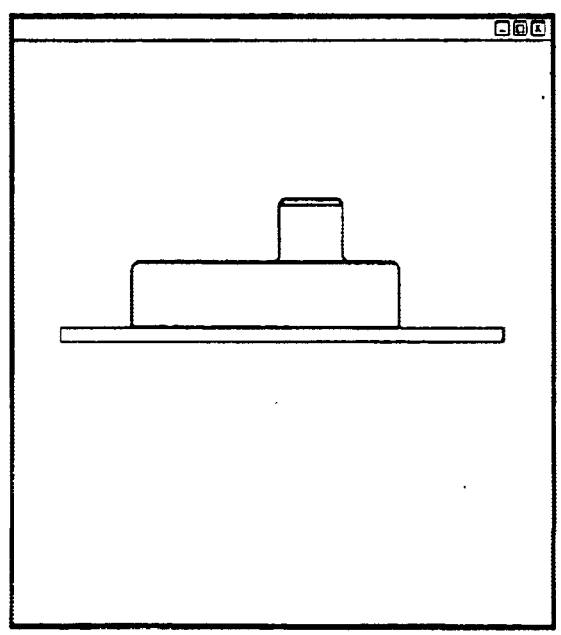
FIG. 6B is a screen display of resultant toolpaths without reflection.

The toolpaths ordering is corrected during the merging of multiple tool paths. The process is shown in FIG. 6.

The following pseudo-code takes multiple post processed tool path files and merges them into one file from the lowest z height to the largest z height. This method applies to multiple toolpaths of the same material and/or different materials:

```
input:
    files = list of source files to merge together
output:
    final output file
functions:
    first_file( ) - returns first file in file list
    last_file( ) - returns last file in file list
    sort_regions( ) - sorts order of toolpaths from minimum z to maximum z
    write_start_info( ) - writes startup information to output file
    regions_remain( ) - returns number of toolpath regions remaining in file
    min_z( ) - returns current lowest z level region in file
    write_predeposit_info( ) - writes information needed prior to depositing region to output file
    write_region( ) - copies toolpath region from source file to output file
    write_postdeposit_info( ) - writes information needed to stop depositing region to output file
    remove_region( ) - deletes regions from input file
    num_regions( ) - number of toolpath regions remaining in file
    remove_file( ) - removes file from list of source files
    write_end info( ) - writes shutdown information to output file
begin
for (cur_file = first_file(files) to last_file(files))
    sort_regions(cur_file);
write_start_info( );
while (regions_remain(files))
{
    cur file = first_file(files)
    z_min = min_z(cur_file)
    for (cur_file = first_file(files) +1 to last_file(files))
        if (z_min > min_z(cur_file))
            z_min = min_z(cur_file);
    for (cur_file = first_file(files) to last_file(files))
        while (z_min == min_z(file))
        {
            write_predeposit_info(cur_file)
            write_region(cur_file)
            write_postdeposit_info(cur_file)
            remove_region(cur_file)
            if (num_regions(cur_file) == 0)
                remove_file(cur_file, files)
        }
}
write_end_info( );
end
```

The write_predeposit_info( ) writes information prior to deposition necessary to select the correct material and process parameters which is understandable by the CNC machine. It then turns on the process before depositing the region. The write_postdeposit_info( ) writes information necessary to stop the processes depositing. Now the source toolpath files have been merged into one file containing information necessary to run the multiple material process continuously.

Figure 7:
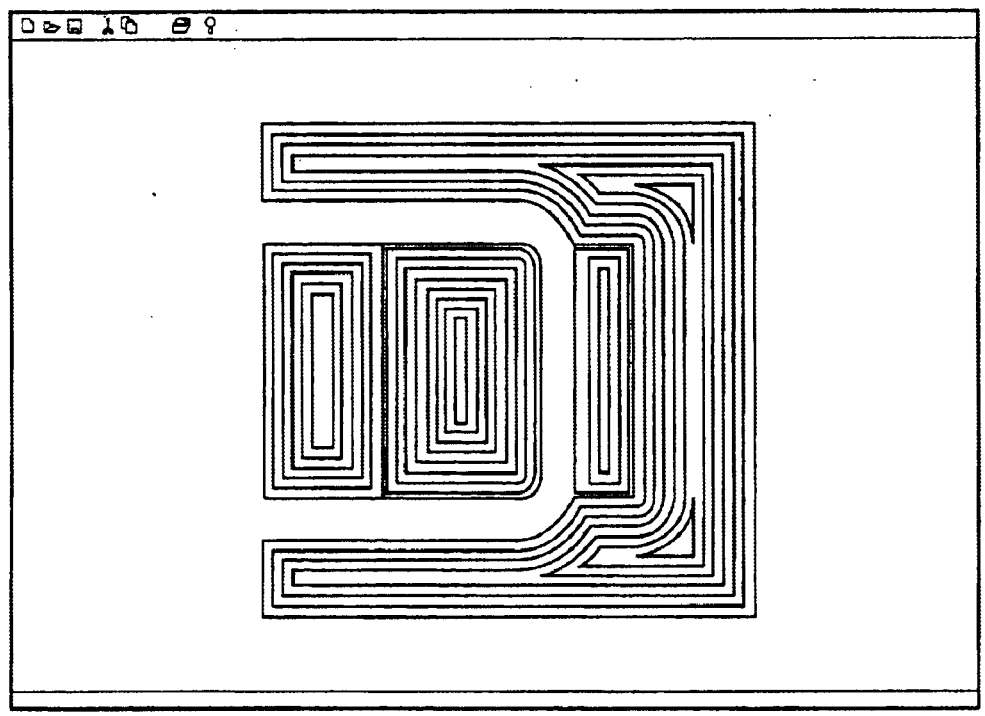
FIG. 7 is a screen display of a sample layer at height 26 mm showing combination of toolpaths for 3 materials.

This algorithm has been implemented in C++. Toolpaths were generated for the geometry displayed in FIG. 2. Listings 1–3 are the CL files generated by I-DEAS software for parts ($P_{f1}$, $P_{f2}$, $P_{f3}$ respectively) which are then post-processed into Listings 4–6 respectively. Listing 7 is the resultant file generated by merging listings 4–6 using the aforementioned algorithm. FIG. 7 shows the results for a layer at height 26 mm.

I claim:
1. A method of modeling a tool path in an additive manufacturing process enabling multi-material parts to be fabricated without material interference, the method comprising the steps of:

separately modeling each material as a single or multiple solid part under the assumption that multiple materials or voids are not present;

ordering the parts from the outermost geometry to the innermost geometry; and performing Boolean operations on the ordered parts to calculate the final volume for each part.

2. The method of claim 1, wherein all of the steps are carried out using a CAD system limited to single-material designs.

3. The method of claim 1, wherein the tool path is a spiral-in, spiral-out, arbitrary direction raster path, or a combination thereof.

4. The method of claim 1, further including the step of reflecting the geometries to accommodate overhang or undercut features.

5. The method of claim 1, further including the step of embedding commands as appropriate to accommodate closed- or open-loop control over the fabrication process.

6. The method of claim 1, further including the steps of:

generating multiple tool paths; and merging the toolpaths into a single toolpath file.

* * * * *